United States Patent [19]

Palmer

[11] 4,217,115
[45] Aug. 12, 1980

[54] DRY CLEANING PROCESSES

[76] Inventor: Reginald J. Palmer, 10 Clump Ave., Box Hill Rd., Tadworth, Surrey, England

[21] Appl. No.: 923,808

[22] Filed: Jul. 12, 1978

[30] Foreign Application Priority Data

Jul. 15, 1977 [GB] United Kingdom .............. 29836/77

[51] Int. Cl.² .............................................. B01D 47/02
[52] U.S. Cl. .......................................... 55/95; 55/89; 55/255; 68/18 F; 202/169
[58] Field of Search .................... 55/85, 89, 95, 255, 55/256, 259; 68/18 R, 18 F

[56] References Cited

U.S. PATENT DOCUMENTS

| 153,453 | 7/1874 | Miller | 55/85 |
|---|---|---|---|
| 242,368 | 5/1881 | Reynolds | 55/95 |
| 852,543 | 5/1907 | Deckebach | 55/255 |
| 1,223,684 | 4/1917 | Fleming | 55/256 |
| 1,977,107 | 10/1934 | Agronofsky | 55/86 |
| 3,177,126 | 4/1965 | Charreau | 68/18 C |
| 3,566,583 | 3/1971 | Ashmore | 55/256 |
| 3,984,219 | 10/1976 | Huang | 55/255 |

FOREIGN PATENT DOCUMENTS

| 47-1750 | 4/1972 | Japan | 55/256 |
|---|---|---|---|
| 51-41670 | 6/1976 | Japan | 55/255 |

*Primary Examiner*—Norman Yudkoff
*Attorney, Agent, or Firm*—Schwartz & Weinrieb

[57] ABSTRACT

A dry cleaning process in which contaminating solvent vapor is removed from a gas stream discharged from a dry cleaning machine and the stream then recycled. As a preliminary to the removal of the solvent vapor the gas is bubbled through an aqueous liquid. In some gas (for example when the solvent is perchloroethylene) the liquid is water and the gas stream is then returned to the machine where it passes over cooling coils so that the solvent vapor condenses and is collected. In other gas (when the solvent is trichloroethane or trichloroethylene) the aqueous liquid is a solution of a catalyst or emulsifying agent, the solvent being recovered by conventional chemical processes. Removal of the solvent is carried out in a recovery tank having inlet means for the gas extending into the bottom of the tank and including a foraminous screen through which gas is bubbled into the liquid in the tank.

9 Claims, 7 Drawing Figures

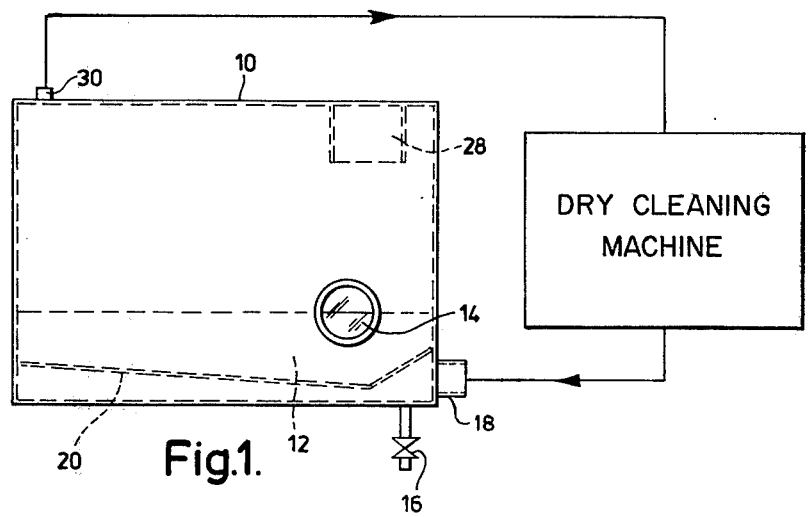
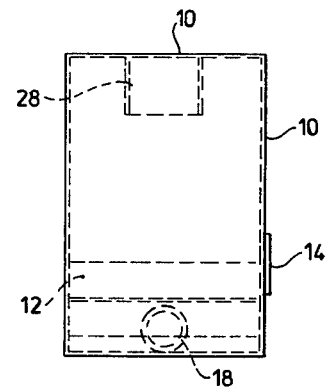
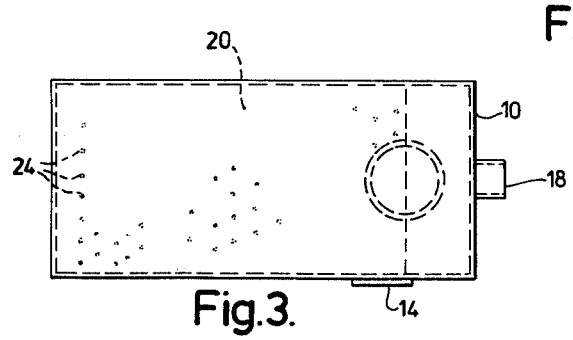

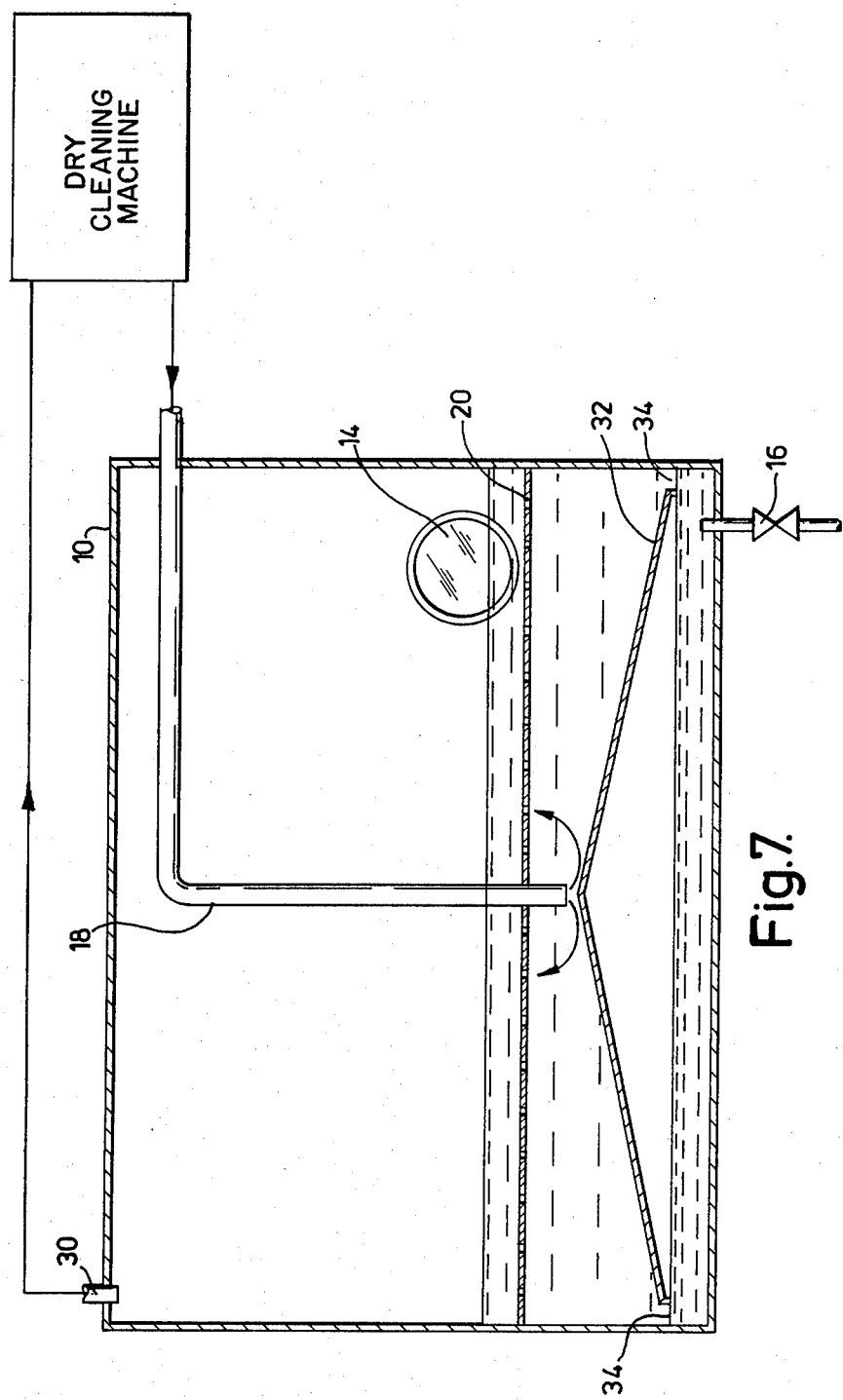

DRY CLEANING PROCESSES

FIELD OF THE INVENTION

This invention relates to dry cleaning and, in particular, the removal of contaminating solvent vapour from a stream of gas from a dry cleaning machine.

BACKGROUND OF THE INVENTION

As is well known, air which has been in contact with solvents or other volatile liquids will contain a variable quantity of solvent or liquid vapour, to the point of saturation, dependent upon the temperature of that air.

The common method used to remove the solvent vapour contained in the air-stream from a dry cleaning machine is to pass the solvent laden air-stream through a bed of activated carbon. The carbon adsorbs the solvent vapour held in the air-stream, allowing the cleaned air to pass through the carbon bed to atmosphere. The carbon bed will only adsorb approximately one gallon of solvent per 80 lb of carbon before becoming saturated with solvent vapour. The carbon bed must then be de-adsorbed by passing a "blanket" of steam through the carbon bed in a reverse direction to that of adsorption. The steam and solvent vapours form an azeotrope which must then be condensed, and the resultant water and liquid solvent separated according to their specific gravities. The stream of gas may then be recycled.

Another known method particularly suitable for use when the solvent is perchloroethylene, is to pass the solvent laden stream over a cooling coil so that the solvent condenses and can be collected for recycling. The stream of gas may also be recycled. This is possible when the solvent is trichloroethane or trichloroethylene but insufficient condensation can be achieved under normal operating conditions and it has been common practice to discharge the solvent laden stream to atmosphere.

SUMMARY OF THE INVENTION

According to this invention, I propose a dry cleaning process in which contaminating dry cleaning solvent vapour in a stream of gas from a dry cleaning machine is removed from the stream of gas which is then recycled to the machine, and comprising as an initial step in the removal of the solvent vapour, bubbling the stream of gas through an aqueous liquid.

Agitation of the liquid by bubbling causes humidification of the solvent laden air-stream which results in improved condensation efficiency, particularly when the solvent is perchloroethane. Preferably, the gas is air and the liquid is water.

In another embodiment, the liquid is an aqueous solution of a catalyst or emulsifying agent for the solvent, whereby as the gas bubbles through the liquid the solvent vapour is removed to form an emulsion from which the solvent can be recovered. This embodiment is particularly suitable for use when the solvent is trichloroethane or trichloroethylene, the gas being air.

Conveniently the emulsifying agent comprises soap, detergent or fatty acids.

The invention also includes apparatus for putting into effect the above dry cleaning process and comprising in combination a dry cleaning machine and a container for liquid, inlet means extending into the bottom of the container and including a foraminous screen through which gas is, in use, bubbled into the liquid in the container, and having a gas outlet in an upper part of the container, connected to the dry cleaning machine for recycling the stream of gas.

The inlet means may comprise a pipe or pipes which extend along the bottom of the container, the foraminous screen being the pipe wall which is perforated with a large number of small holes. In a preferred form, however, the inlet enters the container beneath the foraminous screen which is arranged as a partition across the lower part of the container.

BRIEF DESCRIPTION OF THE DRAWINGS

Embodiments of this invention will now be described by way of example with reference to the accompanying drawings, of which:

FIG. 1 is a cross-sectional elevation of a solvent recovery tank;

FIG. 2 is a cross-sectional end elevation of the tank of FIG. 1;

FIG. 3 is a cross-sectional plan view of the tank of FIG. 1;

FIG. 7 is a cross-sectional view of another embodiment of a solvent recovery tank constructed in accordance with the present invention.

DETAILED DESCRIPTION OF THE ILLUSTRATED EMBODIMENTS

Figure 4:
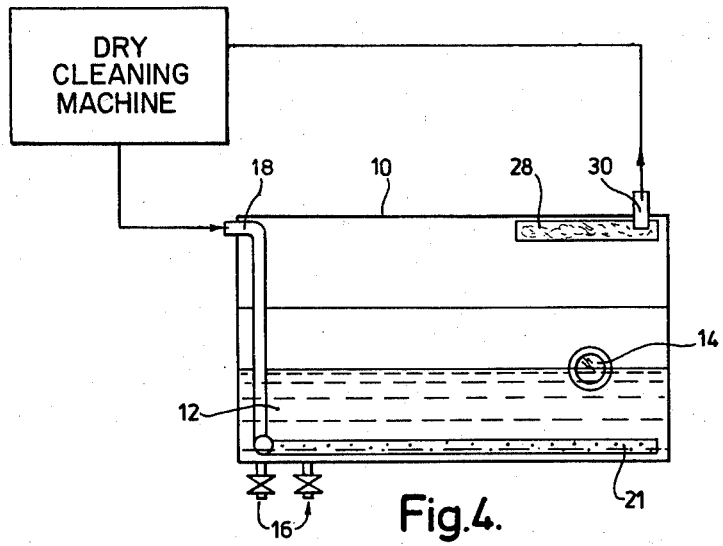
FIGS. 4, 5 and 6 are views similar to FIGS. 1 to 3 but of another solvent recovery tank.

A stream of solvent laden air discharged from a dry cleaning machine is pumped by a compressor (not shown) through an inlet pipe 18 which enters beneath a foraminous screen 20 in a tank 10 containing an aqueous solution of detergent or fatty acid. The screen 20 is perforated by a great number of holes 24. At the top 26 of the tank 10 is a filter 28 through which cooled air passes to the outlet pipe 30 connected for recycling the stream to the dry cleaning machine.

Any water droplets carried by the air-stream to the outlet pipe 30 are removed from that air-stream by means of the filter 28.

Passing a stream of air carrying contaminating solvent vapour through the holes 24 in the foraminous screen 20 produces bubbles in and above the solution. These bubbles burst in the expansion area above the level of the liquid and it is considered that because the volume of solvent laden air is very small in relation to the volume of solution surrounding the air, the solvent vapour in the air contained by the bubbles forms a stable emulsion with the solution.

This solvent solution emulsion then falls into the solution in the bottom of the container. The solution and the bubbles are contained in the expansion area by the filtering element between the expansion area and the outlet to atmosphere, allowing the cleaned air-stream to pass to atmosphere or to be returned to the original source of the solvent laden air-stream. When, eventually, the water/detergent solution is completely emulsified by the addition of solvent, this emulsion is drained from the container to a still, for distillation, and replaced with fresh water/detergent solution.

Figure 5:
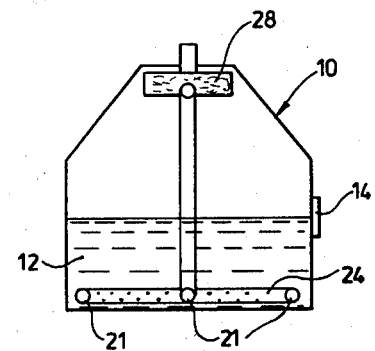
Figure 6:
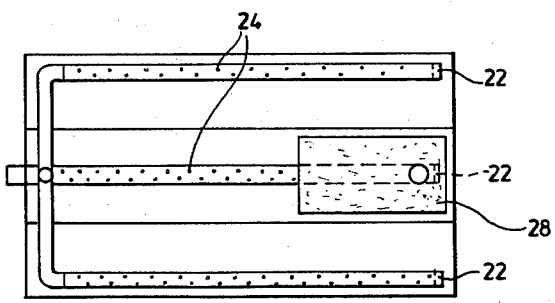

FIGS. 4 to 6 show another form of solvent recovery tank in which the foraminous screen is formed by three branch pipes 21 disposed along the bottom of the tank. The end of each branch pipe 21 is closed by a plug 22 and is perforated by a great number of holes.

Whether or not a catalyst or emulsifying agent is used will depend upon the particular solvent to be removed.

If the solvent is trichloroethane or trichloroethylene then the liquid is an aqueous solution of detergent or fatty acids.

In another embodiment of the invention, particularly suitable for use when the solvent is perchloroethylene, no catalyst or emulsifying agent is added to the water but the turbulence in the water causes humidification of the solvent laden air stream and an azeotrope is formed between the solvent and the water vapour produced in the tank. The azeotrope can then be readily condensed and the resultant solvent and water separated according to their specific gravities. Condensation may be effected in any conveninet manner but use is preferably made of the cooling coil generally fitted in conventional dry cleaning machines. By first of all passing the solvent laden gas stream through the water to generate a stream of bubbles and humidify the gas, a significant increase in the condensation and recovery of solvent can be obtained.

Another form of solvent recovery tank particularly suited for use when the solvent is perchloroethylene as in the above embodiment, is shown in FIG. 7. The tank has an inlet pipe 18 which opens into a space beneath a foraminous screen or partition 20 at the apex of a ridge-like baffle 32 such that air is deflected as shown and bubbles upwardly through the liquid. Any solvent that condenses flows down the baffle 32, through peripheral opeinings 34, and collects in the bottom of the tank. In operation, of the recovery tank and also the tank of FIGS. 1 to 3, the stream of gas maintains the body of liquid above the foraminous screen, the collected solvent being undisturbed.

Obviously, many modifications and variations of the present invention are possible in light of the above teachings. It is therefore to be understood that within the scope of the appended claims, the present invention may be practiced otherwise than as specifically described herein.

I claim:

1. A dry cleaning process, for removing contaminating dry cleaning solvent vapor from a stream of gas from a dry cleaning machine without any loss of said solvent vapor, comprising the steps of:
   bubbling said stream of gas through an aqueous liquid so as to facilitate and enhance the removal of said solvent vapor from said stream of gas through conversion of said solvent vapor into a liquid solvent solution;
   recovering said liquid solvent from said liquid solvent solution;
   recycling said recovered liquid solvent to said dry cleaning machine; and
   recycling said decontaminated stream of gas, including any entrained solvent vapor, to said dry cleaning machine.

2. A dry cleaning process according to claim 1 wherein after passing through the liquid the stream of gas is passed over cooling coils to condense the solvent vapour, the condensate then being collected.

3. A dry cleaning process according to claim 2 wherein the dry cleaning solvent is perchloroethylene, the gas being air and the liquid being water.

4. A dry cleaning process according to claim 1 wherein the liquid is an aqueous solution of a catalyst or emulsifying agent for the solvent, whereby as the gas bubbles through the liquid the solvent vapour is removed to form an emulsion with said solution from which the solvent can be recovered.

5. A dry cleaning process according to claim 4 wherein the solvent is trichloroethane or trichloroethylene, the gas being air.

6. Apparatus for removing contaminating dry cleaning solvent vapor from a stream of gas from a dry cleaning machine without any loss of said solvent vapor, comprising:
   a dry cleaning machine;
   a container housing a liquid;
   foraminous screen means disposed within said container at a level beneath said liquid;
   means for introducing said stream of gas from said dry cleaning machine into said container liquid below said screen means so as to cause said stream of gas to bubble upwardly through said screen means so as to facilitate and enhance the removal of said solvent vapor from said stream of gas through conversion of said solvent vapor into a liquid solventsolution;
   means for recovering said liquid solvent from said liquid solvent solution;
   means for recycling said recovered liquid solvent to said dry cleaning machine;
   means for removing said decontaminated stream of gas, including any entrained solvent vapor, from said container; and
   means for conducting said decontaminated stream of gas from said removal means to said dry cleaning machine.

7. Apparatus as set forth in claim 6, wherein:
   said introducing means comprises a pipe, the open end of which extends downwardly through said screen means; and
   baffle means is disposed beneath said open end to said pipe for deflecting said gas stream upwardly through said screen means.

8. Apparatus according to claim 6 wherein the introducing means enters the container beneath the foraminous screen arranged as a partition across a lower part of the container.

9. Apparatus according to claim 6 wherein the introducing means comprises one or more pipes which extend along the bottom of the container, the foraminous screen being the pipe wall which is perforated with a large number of small holes.

* * * * *